Figure 1:
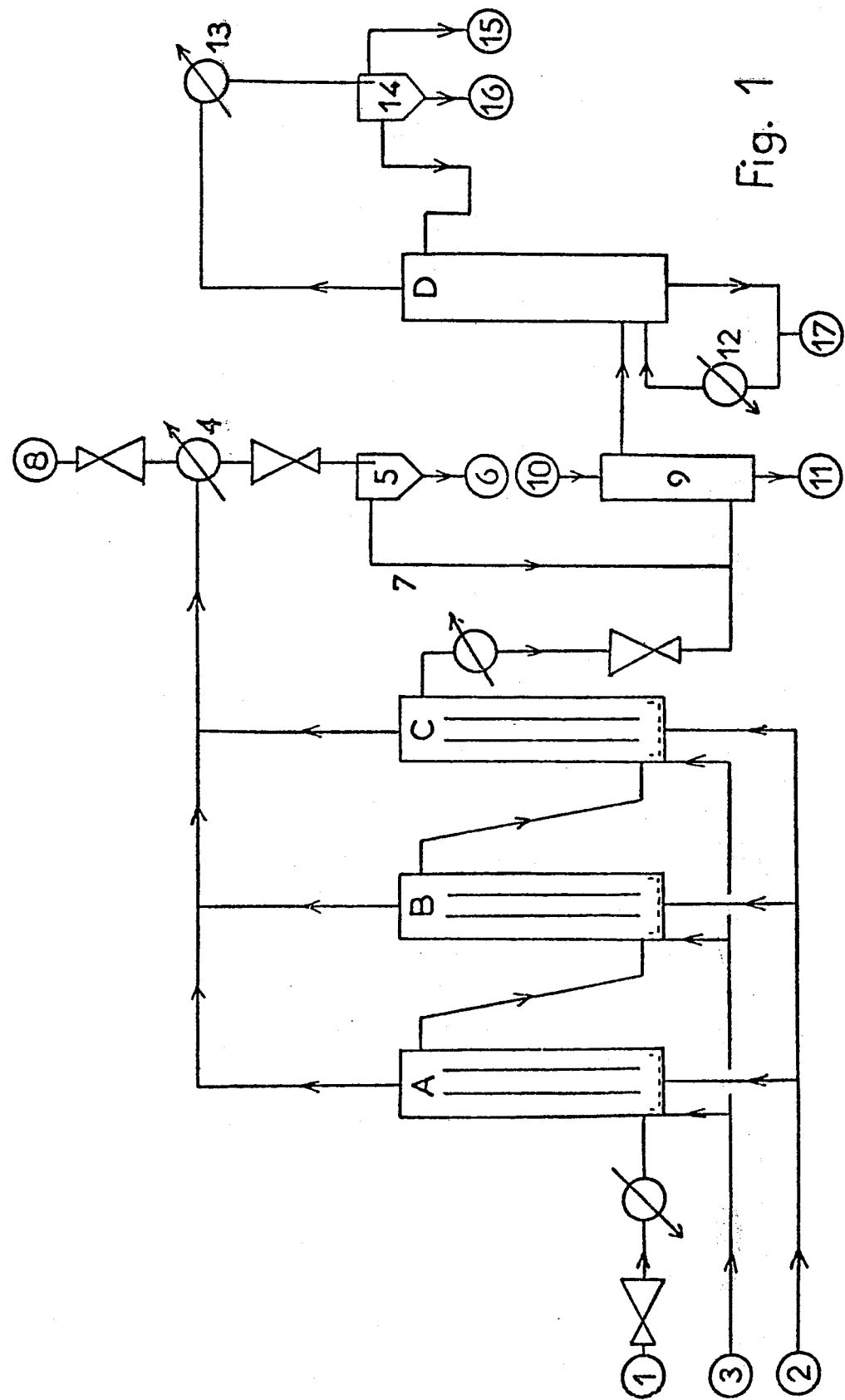

United States Patent [19]
Brunie et al.

[11] 3,927,105
[45] Dec. 16, 1975

[54] PROCESS FOR THE PREPARATION OF MIXTURES OF CYCLOALKANOLS AND CYCLOALKANONES

[75] Inventors: Jean-Claude Brunie; Noel Crenne, both of Lyon, France

[73] Assignee: Rhone-Poulenc S.A., Paris, France

[22] Filed: Feb. 16, 1973

[21] Appl. No.: 333,374

Related U.S. Application Data
[63] Continuation of Ser. No. 814,082, April 7, 1969, abandoned.

[30] Foreign Application Priority Data
Apr. 8, 1968   France ............................ 68.147364

[52] U.S. Cl....... 260/586 P; 260/610 B; 260/617 C; 260/631 R
[51] Int. Cl.² ..................... C07C 27/04; C07C 29/00; C07C 45/00

[58] Field of Search ........ 260/586 R, 586 B, 617 C, 260/631 R, 586 P

[56] References Cited
UNITED STATES PATENTS
2,429,115   10/1947   Atkins ......................... 260/586 B X
FOREIGN PATENTS OR APPLICATIONS
777,087   6/1957   United Kingdom ............ 260/586 R

*Primary Examiner*—Norman P. Morgenstern
*Attorney, Agent, or Firm*—Cushman, Darby & Cushman

[57] ABSTRACT

Mixtures of cycloalkanones and cycloalkanols rich in the former are made by heating solutions of cycloalkyl hydroperoxides in cycloalkanes in the presence of a chromium catalyst in a series of separate reaction zones each essentially uniform.

6 Claims, 2 Drawing Figures

PROCESS FOR THE PREPARATION OF MIXTURES OF CYCLOALKANOLS AND CYCLOALKANONES

This is a continuation of application Ser. No. 814,082, filed Apr. 7, 1969, now abandoned.

The present invention relates to the continuous preparation of mixtures of cycloalkanones and cycloalkanols, from oxidation products containing hydroperoxides arising from the oxidation of cycloalkanes with oxygen.

If a cycloalkane is oxidised by oxygen, e.g. in the form of air, a hydroperoxide forms. This hydroperoxide can then be converted into the cycloalkanone and cycloalkanol, either in situ at the rate at which it is formed, or subsequently in another reactor separate from the oxidation reactor. In the processes where the hydroperoxide is converted at the rate at which it is formed, the process can be carried out in the presence of agents which neutralise the acids formed during the reaction or in the presence of boron derivatives (acids, anhydrides or esters). These processes yield mixtures of oxidation products containing relatively little hydroperoxide and consisting mainly of cycloalkanol.

In the processes where the hydroperoxide is subsequently converted, heating in the presence of granular catalysts deposited on carriers arranged in a fixed bed has been proposed. However the viscous polycondensates formed both during the oxidation and during the deperoxidation tend to deposit on the catalyst bed and to coat the active substance. This results in a progressive de-activation of the catalyst which complicates the running of industrial processes of long duration. It has also been proposed to oxidise cyclohexane by air in the presence of a soluble catalyst derived from cobalt or chromium and then to heat the oxidation mixture, optionally after concentration, without the supplementary addition of a catalyst, in order to decompose the hydroperoxide into derivatives capable of yielding adipic acid by subsequent oxidation (see British Patent Specification No. 777,087). This process also produces mixtures of oxidation products in which the cycloalkanol predominates.

Now the demand for cycloalkanones increases constantly, because of the increasing production of polymers and polycondensates for which these ketones are either synthesis intermediates or preferred solvents.

The processes mentioned above are thus not entirely satisfactory if it is desired to prepare a mixture of cycloalkanol and cycloalkanone rich in cycloalkanone from the corresponding cycloalkane, which is the only economically viable starting material, because it is then necessary to dehydrogenate at least part of the cycloalkanol produced to give the cycloalkanone.

The present invention provides a process for the continuous preparation of a mixture of cycloalkanol and cycloalkanone which is rich in the cycloalkanone which comprises heating a solution of a cycloalkyl hydroperoxide in the corresponding cycloalkane obtained by oxidising the cycloalkane in the liquid phase with molecular oxygen, in the liquid phase, at from 80° to 150°C. in the presence of a soluble chromium compound as catalyst, in a series of separate reaction zones, in each of which the hydroperoxide concentration is maintained at an essentially uniform value throughout the zone.

Any cycloalkane oxidation product containing hydroperoxides can be treated by the new process, but of course the benefit derived from the new method of treatment is greater when dealing with oxidation products which have been more especially prepared with a view to the formation of hydroperoxide, because in this case the proportion of undesirable products in the initial starting material is a minimum. Thus in practice it is generally advantageous to start from an oxidation product obtained by oxidation of a cycloalkane with air without a catalyst and optionally under pressure, the temperature and the degree of transformation being so chosen as to limit the production of the undesirable products to the maximum extent. The process is of course carried out in an apparatus which does not catalyse the decomposition of the hydroperoxide, and, in the case of a steel apparatus, this assumes a prior passivation, for example with pyrophosphates. If the oxidation product is prepared especially to obtain the hydroperoxide, the oxidation is generally limited to a degree of conversion of less than 10 percent, preferably between 2 and 6 percent. In addition to the cycloalkyl hydroperoxide, the oxidation products contain cycloalkanol, cycloalkanone and various by-products. Such oxidation products can be subjected as such to the deperoxidation treatment of the invention. The oxidation product can also be adjusted to any desired concentration before undergoing the deperoxidation treatment. However since the deperoxidation is exothermic, it is preferable not to use too concentrated solutions to avoid excessive heating which is detrimental to good yields being obtained. In practice, there is no value employing oxidation product solutions in which the total peroxide concentration is greater than 15 percent. Since the oxidation is frequently carried out under pressure, a simple means of concentrating the oxidation product used in this way is to release the pressure from the hot oxidation product issuing from the oxidation vessel. Such oxidation solutions can be advantageously prepared according to the process described in French Pat. No. 1,491,518. Before subjecting them to the deperoxidation treatment, it is advantageous to remove at least partially the acids which they contain, for example by washing with water.

The temperature can be the same in all the deperoxidation zones or can vary from one zone to the other, but is from 80° to 150°C. At temperatures which are too low the speed of decomposition of the hydroperoxide drops considerably, while above 150°C., for a given number of deperoxidation zones, the selectivity in respect of cycloalkanone tends to decrease. The process is preferably carried out at 100°C. to 130°C.

The hydroperoxide is decomposed in stages, in step with the progress of the cyclohexane solution from the first to the last deperoxidation zone.

The selectivity with respect to production of the cycloalkanone is the better, the greater is the number of deperoxidation zones, and this effect is the more marked the higher the deperoxidation temperature. The choice of the number of deperoxidation zones is thus determined above all as a function of the economic and technological requirements, which aim to reconcile a reasonable hourly production with an apparatus of rather restricted volume. By way of example, if the cycloalkane is cyclohexane, and if the process is carried out under the temperature conditions mentioned above, two to six successive zones are advantageously used.

These deperoxidation zones may be located in different types of apparatus usually employed to obtain homogeneous phases of a uniform concentration. It is, for example, possible to use recirculation columns, simple columns provided with a stirring system, or autoclaves. It is advisable to combine each of the zones with a device which allows the water formed during the deperoxidation to be separated, and this water can be removed from the zone as a binary azeotrope with the cycloalkane, optionally in a stream of an inert gas. The deperoxidation zones may advantageously be arranged in a cascade.

The catalysts which can be used are chromium derivatives which have a solubility of at least 0.1 g/liter in the cycloalkanes at ambient temperature. Suitable soluble catalysts are, for example, chromium (III) carboxylates such as naphthenates, octoates and stearates, carbonyl derivatives, chelate derivatives, chromium (VI) carboxylates such as chromyl acetate, t-alkyl chromates such as t-butyl chromate, and cycloalkyl chromates such as cyclohexyl chromate. The preferred catalysts are the chromium octoates and t-alkyl or cycloalkyl chromates. As the various deperoxidation zones contain cycloalkanol, the corresponding chromate can be prepared in the same zone by introducing one of its precursors such as chromic oxide or its complex with pyridine.

The amount of catalyst may vary within wide limits but the process is generally carried out in such a way that the amount of chromium introduced by the catalyst is in total between 1 mg. and 1 g. (as metal) per 1 kg. of peroxides contained in the solution subjected to the deperoxidation treatment. The whole of the catalyst can be introduced into the first deperoxidation zone or it can be distributed between the different deperoxidation zones by any appropriate means.

In practice, in order to carry out the new process, the cycloalkane oxidation product, optionally preheated, is introduced continuously into the first deperoxidation zone with at least a part of the suitable quantity of catalyst. The temperature of the zone is controlled by any appropriate means of heat exchange, and the flow rate of the oxidation product introduced is adjusted as functions of the degree of deperoxidation selected for this first zone. If the deperoxidation temperature is higher than the boiling point of the mixture, the apparatus can be placed under autogenous pressure, which can optionally be combined with pressure applied through the introduction of an inert gas. As a general rule, the pressure is between atmospheric pressure and 25 atmospheres.

The partially deperoxidised oxidation product which has issued from the first zone is continuously passed into the second deperoxidation zone, optionally in the presence of part of the catalyst, and in this zone the residual hydroperoxide again undergoes a partial deperoxidation. The process thus continues up to the last deperoxidation zone, on issuing from which the effluent mixture, which is practically free of hydroperoxide, can be treated by the usual processes for separation of the cycloalkanone and cycloalkanol products. It is, for example, possible to distil the product and in this case the last deperoxidation zone can be advantageously combined with the distillation and pre-concentration process. It is preferable for the concentration of hydroperoxide in the solution entering the last deperoxidation zone to be low, and the process is generally carried out in such a way that at least 60 percent of the peroxides present on entering the first zone have been decomposed before the last deperoxidation zone.

The process of the invention can be applied to cycloalkane oxidation products having 5 to 16 carbon atoms in the ring, and in particular to those arising from cycloalkanes having 6–12 carbon atoms in the ring. It is of particular value in the conversion of cyclohexane into a mixture of cyclohexanone and cyclohexanol containing a major proportion of cyclohexanone.

The Examples which follow illustrate the invention and show how it can be put into practice.

EXAMPLE 1

The apparatus used is shown schematically in FIG. 1 of the accompanying drawings. It comprises three stainless steel recycling columns A, B and C. Each of the columns is in the shape of a cylinder (of height 178 cm. and internal diameter 5 cm.) provided with a coaxial internal cylinder (internal diameter 3 cm.) having a useful capacity of 3.1 liters, and is equipped with an external jacket containing a heating fluid at 123°C. These columns are arranged in a cascade.

A pre-concentrated cyclohexane solution at 95°C, originating from the oxidation of cyclohexane by air without a catalyst and containing, after concentration, 10.8% of peroxides, 2.43% of cyclohexanol, 1% of cyclohexanone and 3.35% of products of low volatility consisting principally of acids and esters, is introduced at 1 into the base of the column A at the rate of 13.5 kg/hour. At the bottom of each column nitrogen is introduced at the rate of 100 l/hour at 2 and, at 3, an 0.03% strength solution in cyclohexane of chromium octoate containing 10.8% by weight of metal is introduced at the rate of 0.8 kg/hour for columns A and B and 0.48 kg/hour for column C. Inside each column the temperature is 115°C. and the pressure 2.5 bars (relative).

The nitrogen and the products carried over (water, cyclohexane, cyclohexanol, cyclohexanone) issuing from the upper part of each of the columns are passed to the condenser 4. The condensed products are passed to the decanter 5 which allows the water to be separated at 6 and the organic phase at 7, whilst the uncondensed gases are removed at 8.

The liquid phase which overflows from column C is cooled to 40°C, expanded to atmospheric pressure and washed in counter-current, together with the organic phase separated from the decanter 5, in a column 9 fed at 10 with an 8 percent strength aqueous ammoniacal solution at the rate of 4 kg/hour; the aqueous phase is removed at 11 whilst the organic phase is introduced into a plate column D which simultaneously ensures the decomposition of the residual peroxides and the removal of the greater part of the cyclohexane.

At its bottom this column is provided with a boiler which keeps the liquid at the bottom at a temperature of 115°C. The vapourised fraction (cyclohexane and water) is condensed at 13 and then collected in the decanter 14 which separates the cyclohexane at 15 and the aqueous phase at 16.

The mixture of products of low volatility is collected at 17 and distilled.

The amounts of peroxides, cyclohexanol and cyclohexanone present at different stages of the process for 100 kg. of the solution introduced at 1 are indicated below.

|  | Peroxides kg | Cyclohexanone kg | Cyclohexanol kg |
|---|---|---|---|
| Solution to be treated | 10.8 | 1 | 2.43 |
| on issuing from A | 5.55 | 4.21 | 3.41 |
| on issuing from B | 2.43 | 5.67 | 3.80 |
| on issuing from C | 1.51 | 5.94 | 4.08 |
| on issuing from D | 0 | 6.75 | 3.76 |

EXAMPLE 2

Figure 2:
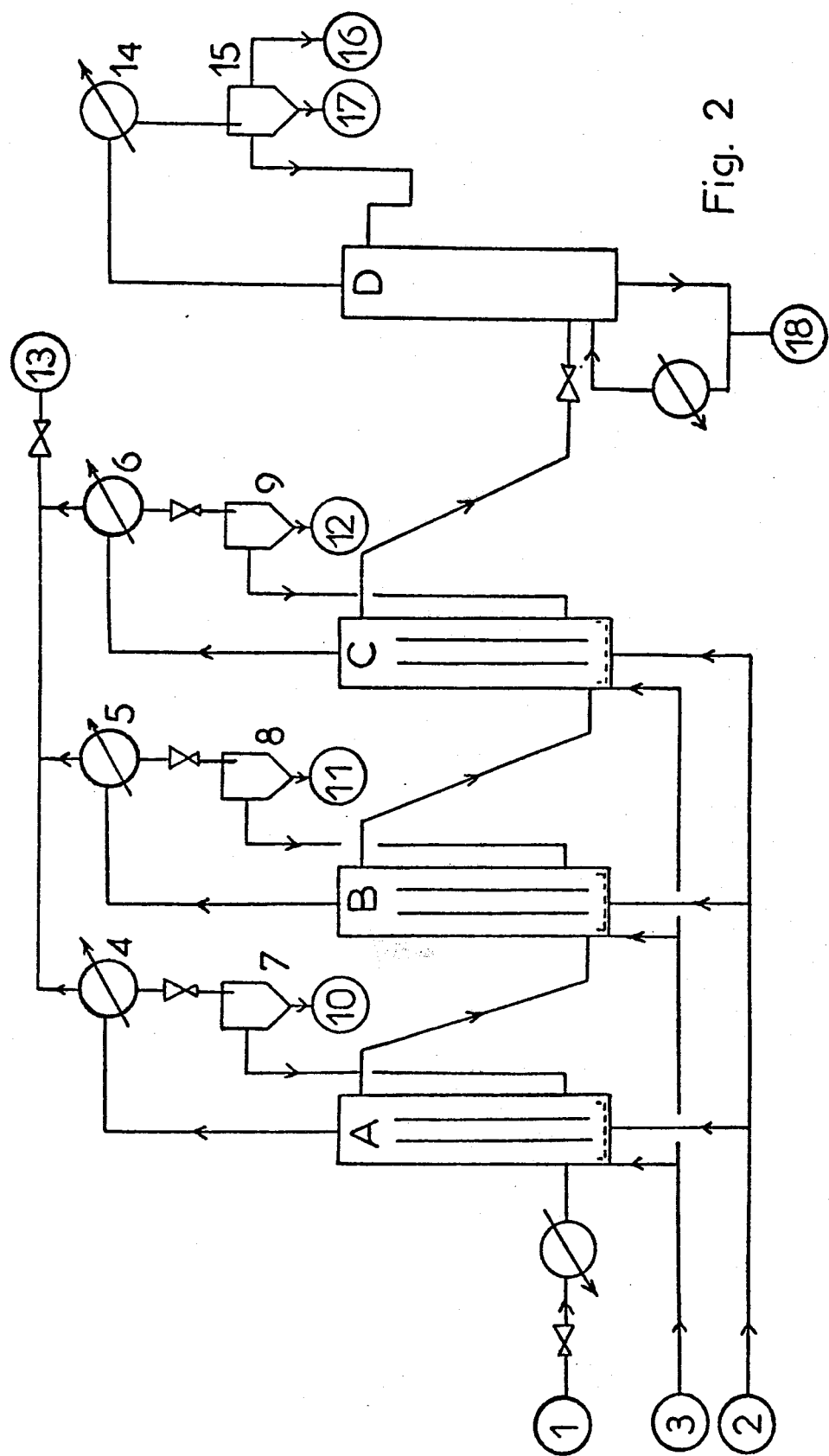

The apparatus used is shown schematically in FIG. 2. It comprises three stainless steel recycling columns A, B and C. Each column is in the shape of a cylinder (of height 260 cm and internal diameter 5 cm.) provided with a coaxial internal cylinder (internal diameter 3 cm.) having a useful capacity of 3.1 liters, and is equipped with an external jacket containing a heating fluid at 105°C. These columns are arranged in a cascade.

At the bottom of column A there is introduced at 1, at the rate of 9.64 kg/hour, a cyclohexane solution at 100°C. originating from the oxidation of cyclohexane by air without a catalyst, which has been washed in counter-current with water (10 percent of its weight) and then dried by distillation of the water-cyclohexane azeotrope. This solution contains, by weight, 9.8% of peroxides. 2.76% of cyclohexanol, 1% of cyclohexanone and 1% of products of low volatility consisting mainly of acids and esters.

At the bottom of each column nitrogen is also introduced at 2 at the rate of 200 1/hour, while at 3 an 0.0825 strength solution of t-butyl chromate in cyclohexane is introduced at the rate of 0.312 kg/hour for each of columns A, B and C.

Inside each column the temperature is 105°C. and the pressure 2.6 bars (relative). At the upper part of each column the nitrogen and the products carried with it (essentially water and cyclohexane) are condensed at 4, 5 and 6, and the condensed products are decanted at 7, 8 and 9, allowing the water to be separated at 10, 11 and 12, while each of the organic phases is returned to the bottom of the corresponding column. The uncondensed gases are removed at 13 after expansion. The liquid phase which overflows from column (C) is expanded to atmospheric pressure at the bottom of a plate column (D) which simultaneously provides for the decomposition of the residual peroxides and the removal of the greater part of the cyclohexane. At the bottom this column (D) is provided with a boiler which maintains the liquid at 110°C. The vaporised fraction (cyclohexane and water) is condensed at (14) and then collected in the decanter 15 which separates the cyclohexane at (16) and the aqueous phase at 17.

The mixture of products of low volatility is collected at (18) and distilled. The amounts of peroxides present at different stages of the process per 100 kg of solution fed in at (1) is given below:
  solution to be treated:9.8;
  on issuing from A:4.33;
  on issuing from B:1.66;
  on issuing from C:0.53;
  on issuing from D:0

After 98 hours continuous operation an average hourly production of 764 g. of cyclohexanone and 457 g. of cyclohexanol was obtained.

We claim:

1. In a process for the continuous preparation of a mixture of cycloalkanone and cycloalkanol by decomposition of a solution of cycloalkyl hydroperoxide in the corresponding cycloalkane, said solution being obtained by oxidation of the cycloalkane in the liquid phase with molecular oxygen, said decomposition being carried out in the liquid phase by heating the solution in the presence of a catalyst which is a chromium compound soluble in the cycloalkane at ambient temperature, the improvement comprising decomposing said hydroperoxide by heating said solution containing 2–15 percent by weight hydroperoxide at 80° – 150° C. in the presence of a chromium compound having a solubility of at least 0.1 g/liter in the cycloalkane at ambient temperature, the heating carried out in a series of separate reaction zones, in each of which the hydroperoxide concentration is maintained at an essentially uniform value throughout the zone, and from each of which the water formed during the deperoxidization is separated, thereby producing a mixture of cycloalkanol and cycloalkanone rich in cycloalkanone.

2. Process according to claim 1 in which said heating is at a temperature of 100° to 130°C.

3. Process according to claim 1 in which the catalyst concentration in each reaction zone is such as to provide from 1 mg. to 1 g. of chromium per kg. of hydroperoxide.

4. Process according to claim 1 in which the reaction pressure in each reaction zone is 1 to 25 atmospheres.

5. Process according to claim 1 in which the decomposition reaction is carried out in two to six zones and at least 60 percent of the peroxides entering the first zone is decomposed before the last zone.

6. In a process for the continuous preparation of a mixture of cyclohexanone and cyclohexanol by decomposition of a solution of cyclohexyl hydroperoxide in cyclohexane, said solution being obtained by oxidation of the cyclohexane in the liquid phase with molecular oxygen, said decomposition being carried out in the liquid phase by heating the solution in the presence of a catalyst which is a chromium compound soluble in the cyclohexane at ambient temperature, the improvement comprising decomposing the cyclohexyl hydroperoxide by heating said solution containing 2–15 percent by weight hydroperoxide at 80°–150° C. in the presence of a chromium compound having a solubility of at least 0.1 g per liter in cyclohexane at ambient temperature, the heating being carried out in a series of separate reaction zones, in each of which the hydroperoxide concentration is maintained at an essentially uniform value throughout the zone, and from each of which the water formed during the deperoxidization is separated, thereby producing a mixture of cyclohexanol and cyclohexane rich in cyclohexanone.

\* \* \* \* \*